United States Patent Office  3,105,063
Patented Sept. 24, 1963

3,105,063
TERTIARY AMINE NITROGEN-CONTAINING HYDROXY - TERMINATED POLYETHER - BASED URETHANE COMPOSITIONS
Adolfas Damusis, Detroit, Mich., assignor to Wyandotte Chemicals Corporation, Wyandotte, Mich., a corporation of Michigan
No Drawing. Filed Mar. 26, 1959, Ser. No. 802,017
12 Claims. (Cl. 260—77.5)

The present invention relates to novel branched tertiary amine nitrogen-containing hydroxy-terminated polyether-based urethane compositions which are useful as hydroxy-terminated urethane components for two-component polyurethane coatings or corresponding one package systems which employ as the other, or diisocyanate ingredient, a blocked isocyanate, and which are also of special utility as bodying agents for urethane coatings, particularly when it is not desired to employ thermoplastic resins for such purpose.

It is an object of the present invention to provide novel bodying agents for urethane coatings. It is a further object to provide novel and valuable branched tertiary amine nitrogen-containing hydroxy-terminated urethane components for polyurethane coatings systems. A further object is the provision of such compositions which are polyether-based urethanes. Another object is the provision of such urethane compositions which lend advantageous properties to polyurethane coatings in which they are employed as the hydroxy-terminated component or ingredient. Still another object of the invention is the provision of a process for the production of such urethane compositions by the reaction of one molar proportion of a selected arylene diisocyanate with about two molar proportions of a selected tertiary amine nitrogen-containing polyether polyol, and the products thereby produced. Other objects of the invention will become apparent hereinafter.

The foregoing and additional objects are accomplished by the provision of branched urethane compositions of the following idealized formula:

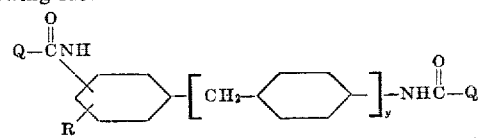

wherein R is selected from hydrogen and methyl, wherein y is a number from zero to one, inclusive, and wherein Q is the same in both occurrences and is the radical of a branched tertiary amine nitrogen-containing polyether polyol (b), which is a propylene oxide addition product of a tertiary amine nitrogen-containing polyol containing at least three and not more than four hydroxy groups per molecule, said urethane composition being prepared by the reaction of about one molar proportion of arylene diisocyanate (a) selected from the group consisting of phenylene diisocyanate, tolylene diisocyanate, and diphenylmethane-4,4'-diisocyanate, with about two molar proportions of the selected branched tertiary amine nitrogen-containing polyether polyol (b).

Presence of the tertiary amine nitrogen in these urethane compositions is very significant. It acts as a built-in catalyst, speeds up curing of polyurethane coatings embodying these hydroxy-terminated urethanes as one component or ingredient, and affects favorably the properties of polyurethane coatings formed therefrom by reaction with an isocyanate-terminated component or ingredient. Properties favorably affected are surface hardness, film toughness, solvent resistance, and abrasion resistance.

The branched tertiary amine nitrogen-containing hydroxy-terminated urethane compositions of the present invention have certain advantages over ordinary hydroxyl-bearing materials such as polyesters and regular polyols. Polyurethane coatings prepared therefrom by reaction with an isocyanate-terminated component dry to touch upon evaporation of solvent, and have considerably less sagging tendency than polyurethane coating formulations incorporating regular polyols. When the branched tertiary amine nitrogen-containing hydroxy-terminated urethane compositions of the present invention are reacted with an isocyanate-terminated component, the resulting polyurethane surface coatings are characterized by properties which are superior to those obtained from the same isocyanate component and previously known polyhydroxy components. The same is true when they are employed as one ingredient of a one package surface coating composition together with a blocked diisocyanate as the other ingredient (for example, in baking enamels or wire coatings).

The branched tertiary amine nitrogen-containing hydroxy-terminated urethane compositions of the present invention are prepared by reacting about one molar proportion of an appropriate arylene diisocyanate (a), selected from phenylene diisocyanate, 2,4-tolylene diisocyanate, 2,6-tolylene diisocyanate, including mixtures of 2,4 and 2,6-tolylene diisocyanates, and diphenylmethane-4,4'-diisocyanate, with about two molar proportions of the selected tertiary amine nitrogen-containing branched polyether polyol (b) to produce a hydroxy-terminated urethane composition in which the terminal hydroxy groups are furnished by the tertiary amine nitrogen-containing polyether polyol molecule.

The branched polyether polyol (b) used in the reaction is a propylene oxide addition product of a tertiary amine nitrogen-containing polyol, and includes compounds encompassed by the formula:

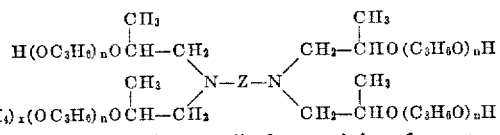

wherein Z is an alkylene radical containing from two through six carbon atoms, and wherein n is a number from one to three, inclusive, preferably not more than an average of two, and wherein x is a number from zero to one, inclusive, which include, for example, the addition products of one mol of N,N,N',N'-tetrakis(2-hydroxypropyl)ethylene diamine with four to 12 mols of propylene oxide, addition product of one mol of N,N,N',N'-tetrakis(2-hydroxypropyl)ethylene diamine with four to 12 mols of propylene oxide and then with one mol of ethylene oxide, the corresponding higher alkylene diamines, such as the addition product of N,N,N',N'-tetrakis(2-hydroxypropyl)propylene diamine with from four to 12 mols of propylene oxide and the mono ethylene oxide further addition products thereof, the corresponding tetramethylene and hexamethylene diamines, and the N,N,N',N'-tetrakis(2-hydroxypropyl)tetramethylene and hexamethylene diamine tetra through dodeca propylene oxide addition products thereof and such adducts further reacted with one mol of ethylene oxide, and the like. Addition of one mol of ethylene oxide provides a primary hydroxyl group of relatively high reactivity for definite direction and precedence of reaction with NCO groups in preparing the OH-terminated urethane.

Also included within the scope of the polyol (b) are compounds encompassed by the formula:

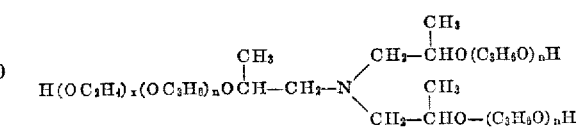

wherein $n$ is a number from one to three, inclusive, preferably not more than an average of two, and wherein $x$ is a number from zero to one, inclusive, which include, for example, the triisopropanolamine addition products with from three to nine mols of propylene oxide, and triisopropanolamine addition products with three to nine mols of propylene oxide and then with one mol of ethylene oxide, and the like.

In practice, the molecular weights of the branched tertiary amine nitrogen-containing hydroxy-terminated urethane compositions of the invention, prepared in the given manner, have been found to be very close to the molecular weight of a composition having an idealized structure, since very little polymerization occurs using predetermined molar proportions under moderate reaction conditions, viz., exclusion of moisture and initial reaction temperature not above about 60° C. Also, in practice, a tertiary amine nitrogen-containing polyol having no more than about two propylene oxide units added per individual chain of starting polyol is usually preferred, and of the tertiary amine nitrogen-containing polyols, N,N,N',N'-tetrakis(2-hydroxypropyl)ethylene diamine derivatives are preferred. As for the isocyanate employed, tolylene diisocyanate, usually a mixture of about 80%/20% of the 2,4 and 2,6-isomers, is preferred for reasons of economy. Other variations in the starting materials to procure variations in the substituents of the branched tertiary amine nitrogen-containing hydroxy-terminated urethane compositions may be usefully made to obtain polyurethane surface coatings of varying types and characteristics upon reaction with a selected polyisocyanate component. For example, lengthening of the polyoxypropylene chains shown in the above formulae results in a polyurethane coating having a longer pot life, greater flexibility, and lower solvent resistance, while shortening of these polyoxypropylene chains has just the opposite effect. Flexibility of such coatings can, for example, be readily adjusted by changing the length of the polyoxypropylene branches of the tertiary amine nitrogen-containing polyol ($b$), if desired. The preferred equivalent weight of the tertiary amine nitrogen-containing hydroxy-terminated urethanes of the present invention is between about 200 and 400.

The following examples are given to illustrate the present invention but are not to be construed as limiting.

GENERAL PROCEDURE

Hydroxy-terminated urethanes, such as OH–1NA of Example 1, are prepared by reacting together about one mol of the selected arylene diisocyanate and about two mols of a tertiary amine nitrogen-containing polyether triol or tetraol in order to form a hydroxy-terminated urethane with free OH groups on both ends of the molecule. The addition of two tertiary amine nitrogen-containing polyether triol molecules to the starting arylene diisocyanate makes the NCO/OH ratio 1/3.0, while two tetraol molecules makes the ratio 1/4. Dilution of the OH-terminated urethane, if desired, may be with any suitable non-reactive surface coating solvent, or the reaction may be conducted in the presence of such a solvent. Many such solvents suitable in general for urethane coatings and components thereof are known in the art, for example, 2-ethoxyethyl acetate, 2-methoxyethyl acetate, 2-butoxyethyl acetate, toluene, xylene, ethyl acetate, butyl acetate, amyl acetate, other similar esters, ketones, nitroaliphatic solvents, dioxane, and the like. In most instances no solvent is required during the reaction.

Tertiary amine nitrogen-containing polyether polyols used in the reaction are preferably stripped of water by azeotropic distillation with toluene. In this manner, the amount of water can be decreased from 0.08–0.15 to 0.2% or even less. A clean, dry, three-necked five-liter flask was used as a reaction vessel, and a nitrogen blanket was maintained over the reactants.

Example 1

(OH–1NA)

| Reactants | Mols | Parts | Weight, percent |
|---|---|---|---|
| Polyoxypropylene derivative of triisopropanolamine, TIPA, P–450T, M.W. 456 | 2 | 2,736 | 67.2 |
| Tolylene diisocyanate (80/20; 2,4/2,6) | 1 | 522 | 12.8 |
| 2-Ethoxyethyl acetate | | 406 | 10 |
| Xylene | | 406 | 10 |
| | | 4,070 | 100 |

*Procedure.*—2736 parts of the polyoxypropylene derivative of triisopropanolamine P–450T, 406 parts of 2-ethoxyethyl acetate and 406 parts xylene are charged into a 5-liter reaction flask and are stirred gently. Tolylene diisocyanate is added gradually in portions. The temperature of the strongly exothermic reaction is kept below 60° C. After the exothermic reaction stops, the contents of the reaction flask are heated at 70° C. for 3 hours. Thereafter, the contents are cooled and bottled.

Properties of OH–1NA:
  NCO/OH _____ 1/3
  Average molecular weight _____ 1080
  Average equivalent weight _____ 270
  Hydroxyl number _____ 208
  Percent hydroxyl _____ 6.3
Properties of OH–1NA solution:
  Nonvolatile, percent _____ 80
  Weight per gallon, lb. _____ 8.58
  Viscosity at 25° C., cps. _____ 4,000–7,000

OH–1NA IN URETHANE COATINGS [3]

When employed as the second component together with NCO–1 [1] or NCO–3 [2] in a proportion of $$NCO/OH = 1.2/1.0$$

OH–1NA gives films which are hard, tough, and characterized by excellent solvent resistance. They are, however, somewhat less hard and tough, and have a somewhat diminished solvent resistance, compared with the films of Example 2, but are more flexible than the films of Example 2. Chemical and water resistances are excellent. The films prepared at NCO/OH=2.0/1.0 are harder, tougher and of a greater resistance than the films at NCO/OH=1.2/1.0.

Example 2

(OH–1NB)

| Reactants | Mols | Parts | Weight, percent |
|---|---|---|---|
| Polyoxypropylene derivative of N,N,N',N'-tetrakis(2-hydroxypropyl)-ethylene diamine, M.W. 524 | 2 | 3,144 | 68.8 |
| Tolylene diisocyanate (80/20; 2,4/2,6) | 1 | 522 | 11.2 |
| 2-Ethoxyethyl acetate | | 457 | 10 |
| Xylene | | 457 | 10 |
| | | 4,570 | 100 |

---

[1] NCO–1 is the NCO-terminated reaction product of three mols of TDI with one mol of TP 440 polyol (propylene oxide addition product of trimethylolpropane having a M.W. of about 410).
[2] NCO–3 is the NCO-terminated reaction product of two mols of NCO–1 with one mol of P 410 polyol (polypropylene glycol, M.W. about 410).
[3] Numerous other organic polyisocyanates can be used as well as NCO–1 and NCO–3, such as, for example, tri TDI adduct of trimethylolpropane or hexanetriol, the phenyl urethanes of any of the foregoing, TDI, MDI, and the like.

*Procedure.*—Same as in Example 1.

Properties of OH–1NB:
  NCO/OH _____ 1/4
  Average molecular weight _____ 1224
  Average equivalent weight _____ 204
  Hydroxyl number _____ 275
  Percent hydroxyl _____ 8.35
Properties of OH–1NB solution:
  Nonvolatile, percent _____ 80
  Weight per gallon, lb. _____ 8.7
  Viscosity at 25° C., cps. _____ 8,000–10,000

OH–1NB IN URETHANE COATINGS

When employed as the second component together with NCO–1 or NCO–3 in proportion of NCO/OH=2.0/1.0, OH–1NB gives very hard and very solvent-resistant films. They are superior to the films of Example 1 in respect of hardness and solvent resistance but are less flexible.

*Example 3*

(OH–1NC)

| Reactants | Mols | Parts |
|---|---|---|
| TDI (80/20; 2,4/2,6) | 1 | 174 |
| Polyoxypropylene derivative of N,N,N',N'-tetrakis(2-hydroxypropyl)ethylene diamine (6 PO units), M.W. 640 | 2 | 1,280 |
| 2-Ethoxyethyl acetate | | 313 |
| Xylene | | 313 |

*Preparation of OH–1NC.*—Same as in Example 1.

Properties of OH–1NC:
  NCO/OH _____ 1/4
  Average molecular weight _____ 1460
  Average equivalent weight _____ 245
  Hydroxyl number _____ 228
  Percent hydroxyl _____ 6.9

OH–1NC IN URETHANE SURFACE COATINGS

When employed as the second component together with NCO–1 or NCO–3 in the NCO/OH proportions of Example 1, OH–1NC gives urethane films which are slightly less flexible but which have slightly greater solvent resistance than the films of Example 1. Chemical resistance and water immersion resistance are excellent.

*Example 4*

(OH–1ND)

| Reactants | Mols | Parts |
|---|---|---|
| TDI (80/20; 2,4/2,6) | 1 | 174 |
| Polyoxypropylene derivative of triisopropanolamine (TIPA+3 mols of propylene oxide), (M.W. 368) | 2 | 736 |
| 2-Ethoxyethyl acetate | | 114 |
| Xylene | | 141 |

*Preparation of OH–1ND.*—Same as in Example 1.
Properties of OH–1ND:
  NCO/OH _____ 1/3
  Average molecular weight _____ 916
  Average equivalent weight _____ 229
  Hydroxyl number _____ 245
  Percent hydroxyl _____ 7.4

OH–1ND IN URETHANE SURFACE COATINGS

When employed as the second component together with NCO–1 or NCO–3 in the NCO/OH proportions of Example 1, OH/1ND gives urethane films which are less flexible but which have greater solvent resistance than the films of Example 1. Chemical resistance and water immersion resistance are excellent.

*Example 5*

(OH–1NE)

| Reactants | Mols | Parts |
|---|---|---|
| Phenylene diisocyanate | 1 | 160 |
| Monoethylene oxide addition product of a polyoxypropylene derivative of TIPA having a M.W. of 640 | 2 | 1,280 |
| 2-Ethoxyethyl acetate | | 307 |
| Xylene | | 307 |

*Preparation of OH–1NE.*—Same as in Example 1.
Properties of OH–1NE:
  NCO/OH _____ 1/3
  Average molecular weight _____ 1444
  Average equivalent weight _____ 361
  Hydroxyl number _____ 155
  Percent hydroxyl _____ 4.7

OH–1NE IN URETHANE SURFACE COATINGS

When employed as the second component together with NCO–1 or NCO–3 in the NCO/OH proportions of Example 1, OH–1NE gives urethane films which are more flexible but which have less solvent resistance than the films of Example 1. Chemical resistance and water immersion resistance are excellent.

*Example 6*

(OH–1NF)

| Reactants | Mols | Parts |
|---|---|---|
| Diphenylmethane-4,4'-diisocyanate | 1 | 250 |
| Addition product of 10 mols of propylene oxide to one mol of N,N,N',N'-tetrakis(2-hydroxypropyl)propylene diamine (M.W. 890) | 2 | 1,780 |
| 2-Ethoxyethyl acetate | | 435 |
| Xylene | | 435 |

*Preparation of OH–1NF.*—Same as in Example 1.

Properties of NH–1NF:
  NCO/OH _____ 1/4
  Average molecular weight _____ 2030
  Average equivalent weight _____ 338
  Hydroxyl number _____ 166
  Percent hydroxyl _____ 5.03

OH–1NF IN URETHANE SURFACE COATINGS

When employed as the second component together with NCO–1 or NCO–3 in the NCO/OH proportions of Example 1, OH–1NF gives urethane films which are more flexible but which have less solvent resistance than the films of Example 1. Chemical resistance and water immersion resistance are excellent.

*Example 7*

(OH–1NG)

| Reactants | Mols | Parts |
|---|---|---|
| TDI (80/20; 2,4/2,6) | 1 | 174 |
| Addition product of 8 mols of propylene oxide to one mol of N,N,N',N'-tetrakis(2-hydroxy-propyl)ethylene diamine (M.W. 780) | 2 | 1,560 |
| 2-Ethoxyethyl acetate | | 372 |
| Xylene | | 372 |

*Preparation of OH–1NG.*—Same as in Example 1.
Properties of OH–1NF:
  NCO/OH _____ 1/4
  Average molecular weight _____ 1740
  Average equivalent weight _____ 290
  Hydroxyl number _____ 194
  Percent hydroxyl _____ 5.86

OH–1NG IN URETHANE SURFACE COATINGS

When employed as the second component together with NCO–1 or NCO–3 in the NCO/OH proportions of Example 1, OH–1NG gives urethane films which are very close in properties to those of Example 1. Chemical resistance and water immersion resistance are excellent.

*Example 8*

(OH-1NH)

| Reactants | Mols | Parts |
|---|---|---|
| TDI (2,4) | 1 | 174 |
| Addition product of 12 mols of propylene oxide to one mol of N,N,N',N'-tetrakis(2-hydroxy-propyl)ethylene diamine (M.W. 1,000) | 2 | 2,000 |
| 2-Ethoxyethyl acetate | | 466 |
| Xylene | | 466 |

*Preparation of OH-1NH.*—Same as in Example 1.
Properties of OH-1NH:
 NCO/OH _____ 1/4
 Average molecular weight _____ 2180
 Average equivalent weight _____ 363
 Hydroxyl number _____ 159
 Percent hydroxyl _____ 4.8

OH-1NH IN URETHANE SURFACE COATINGS

When employed as the second component together with NCO-1 or NCO-3 in the NCO/OH proportions of Example 1, OH-1NH gives urethane films which are more flexible but which have less solvent resistance than the films of Example 1. Chemical resistance and water immersion resistance are excellent.

*Example 9*

(OH-1NI)

| Reactants | Mols | Parts |
|---|---|---|
| TDI (80/20; 2,4/2,6) | 1 | 174 |
| Addition product of 4 mols of propylene oxide and one mol of ethylene oxide to one mol of TIPA (M.W. 496) | 2 | 992 |
| 2-Ethoxyethyl acetate | | 146 |
| Xylene | | 146 |

*Preparation of OH-1NI.*—Same as in Example 1.
Properties of OH-1NI:
 NCO/OH _____ 1/3
 Average molecular weight _____ 1172
 Average equivalent _____ 293
 Hydroxyl number _____ 191
 Percent hydroxyl _____ 5.8

OH-1NI IN URETHANE SURFACE COATINGS

When employed as the second component together with NCO-1 or NCO-3 in the NCO/OH proportions of Example 1, OH-1NI gives urethane films which are very close in properties to those of Example 1. Chemical resistance and water immersion resistance are excellent.

*Example 10*

(OH-1NJ)

| Reactants | Mols | Parts |
|---|---|---|
| TDI (80/20; 2,4/2,6) | 1 | 174 |
| N,N,N',N'-tetrakis(2-hydroxypropyl)ethylene diamine addition product with four propylene oxide units and one ethylene oxide unit (M.W. 575) | 2 | 1,150 |
| 2-Ethoxyethyl acetate | | 284 |
| Xylene | | 284 |

*Preparation of OH-1NJ.*—Same as in Example 1.
Properties in OH-1NJ:
 NCO/OH _____ 1/4
 Average molecular weight _____ 1330
 Average equivalent weight _____ 222
 Hydroxyl number _____ 252
 Percent hydroxyl _____ 7.6

OH-1NJ IN URETHANE SURFACE COATINGS

When employed as the second component together with NCO-1 or NCO-3 in the NCO/OH proportions of Example 1, OH-1NJ gives urethane films which are less flexible but which have greater solvent resistance than the films of Example 1. Chemical resistance and water immersion resistance are excellent.

*Example 11*

(OH-1NK)

| Reactants | Mols | Parts |
|---|---|---|
| TDI (80/20; 2,4/2,6) | 1 | 174 |
| Addition product of 9 mols of propylene oxide to one mol of TIPA (M.W. 700) | 2 | 1,400 |
| 2-Ethoxyethyl acetate | | 197 |
| Xylene | | 197 |

*Preparation of OH-1NK.*—Same as in Example 1.
Properties of OH-1NK:
 NCO/OH _____ 1/3
 Average molecular weight _____ 1610
 Average equivalent weight _____ 402
 Hydroxyl number _____ 139
 Percent hydroxyl _____ 4.2

OH-1NK IN URETHANE SURFACE COATINGS

When employed as the second component together with NCO-1 or NCO-3 in the NCO/OH proportions of Example 1, OH-1NK gives urethane films which are more flexible but which have less solvent resistance than the films of Example 1. Chemcial resistance and water immersion resistance are excellent.

*Example 12*

(OH-132N)

| Reactants | Mols | Parts | Weight, percent |
|---|---|---|---|
| Polyoxypropylene derivative of triisopropanolamine, M.W. 365 | 3 | 2,190 | 60.8 |
| Tolylene diisocyanate (80/20; 2,4/2,6) | 2 | 696 | 19.2 |
| 2-Ethoxyethyl acetate | | 361 | 10 |
| Xylene | | 361 | 10 |
| | | 3,608 | 100 |

*Procedure.*—2190 parts of the polyoxypropylene derivative of triisopropanolamine, 361 parts of 2-ethoxyethyl acetate and 361 parts xylene are charged into a 5-liter reaction flask and are stirred gently. Tolylene diisocyanate is added gradually in portions. The temperature of the strongly exothermic reaction is kept below 60° C. After the exothermic reaction stops, the contents of the reaction flask are heated at 70° C. for 3 hours. Thereafter, the contents are cooled and bottled.

Properties of OH-132N:
 NCO/OH _____ 1/2.25
 Average molecular weight _____ 1440
 Average equivalent weight _____ 288
 Hydroxyl number _____ 195
 Percent hydroxyl _____ 5.9

Properties of OH-132N solutions:
 Nonvolatile, percent _____ 80
 Weight per gallon, lb _____ 8.72
 Viscosity at 25° C., cps _____ 10,000–12,000

OH-132N IN URETHANE COATINGS

When employed as the second component together with NCO-1 or NCO-3 in proportion of NCO/OH=1.2/1.0, OH-132N gives urethane films which are extremely hard, tough, and characterized by a very high solvent resistance. Chemical resistance and water resistance are excellent.

It is to be understood that the invention is not limited to the exact details of operation or exact compounds shown and described, as obvious modifications and equivalents will be apparent to one skilled in the art, and the invention is therefore to be limited only by the scope of the appended claims.

I claim:
1. A hydroxy-terminated urethane composition prepared by mixing and reacting together about one molar proportion of arylene diisocyanate (a) selected from the group consisting of phenylene diisocyanate, tolylene diisocyanate, and diphenylmethane-4,4'-diisocyanate, with about two molar proportions of tertiary amine nitrogen-containing polyether polyol (b), said tertiary amine nitrogen-containing polyether polyol (b) being selected from the group consisting of polyols having the formulas:

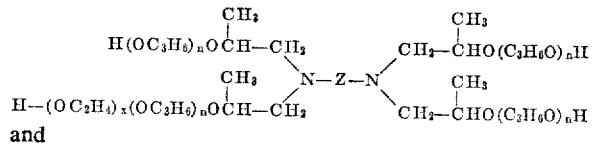

and

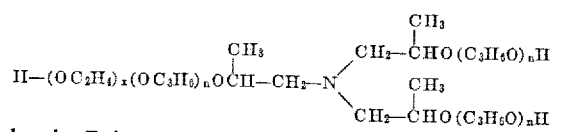

wherein Z is an alkylene radical containing from two through six carbon atoms, wherein n is a number from one to three, inclusive, and wherein x is a number from zero to one, inclusive, to produce the desired hydroxy-terminated urethane composition, the initial reaction temperature being not greater than about sixty degrees centigrade.

2. A hydroxy-terminated urethane composition according to claim 1, wherein the arylene diisocyanate (a) is tolylene diisocyanate and the tertiary amine nitrogen-containing polyether polyol (b) is an alkylene oxide addition product of triisopropanolamine having the formula:

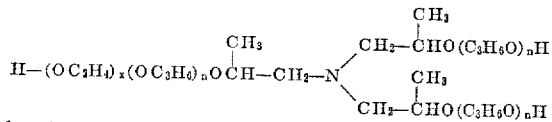

wherein n is a number from one to three, inclusive, and wherein x is a number from zero to one, inclusive.

3. A hydroxy-terminated urethane composition according to claim 1 wherein the arylene diisocyanate (a) is tolylene diisocyanate and the tertiary amine nitrogen-containing polyether polyol (b) is an N,N,N',N'-tetrakis(2-hydroxypropyl)ethylene diamine-alkylene oxide addition product having the formula:

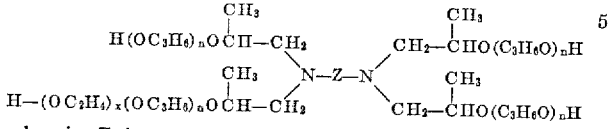

wherein Z is an alkylene radical containing from two through six carbon atoms, wherein n is a number from one to three, inclusive, and wherein x is a number from zero to one, inclusive.

4. A hydroxy-terminated urethane composition according to claim 1 wherein the average equivalent weight is between about 200 and about 400.

5. A solution of a hydroxy-terminated urethane composition according to claim 1 in a surface coating solvent which is nonreactive therewith.

6. A urethane coating composition including as one component a hydroxy-terminated urethane according to claim 1 and including an organic polyisocyanate as a second component.

7. A coating composition according to claim 6, including an organic surface coating solvent which is nonreactive with both the components of the coating composition and the polyurethane product of their reaction.

8. A process for the production of a hydroxy-terminated urethane composition which comprises mixing and reacting together about one molar proportion of arylene diisocyanate (a) selected from the group consisting of phenylene diisocyanate, tolylene diisocyanate, and diphenylmethane-4,4'-diisocyanate, with about two molar proportions of tertiary amine nitrogen-containing polyether polyol (b), said tertiary amine nitrogen-containing polyether polyol (b) being selected from the group consisting of polyols having the formulas:

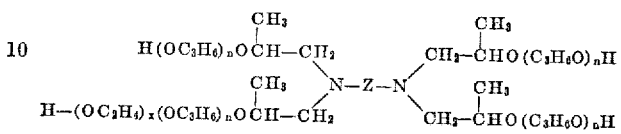

and

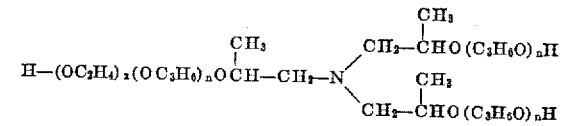

wherein Z is an alkylene radical containing from two through six carbon atoms, wherein n is a number from one to three, inclusive, and wherein x is a number from zero to one, inclusive, to produce the desired hydroxy-terminated urethane composition, the initial reaction temperature being not greater than about sixty degrees centigrade.

9. A process for producing a hydroxy-terminated urethane composition according to claim 8, wherein the arylene diisocyanate (a) is tolylene diisocyanate and the tertiary amine nitrogen-containing polyether polyol (b) is an alkylene oxide addition product of triisopropanolamine having the formula:

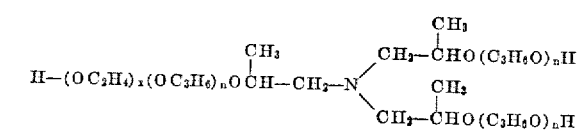

wherein n is a number from one to three, inclusive, and wherein x is a number from zero to one, inclusive.

10. A process for producing a hydroxy-terminated urethane composition according to claim 8, wherein the arylene diisocyanate (a) is tolylene diisocyanate and the tertiary amine nitrogen-containing polyether polyol (b) is an N,N,N',N'-tetrakis(2-hydroxypropyl)ethylene diamine-alkylene oxide addition product having the formula:

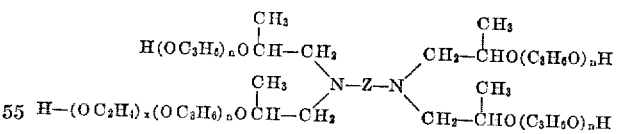

wherein Z is an alkylene radical containing from two through six carbon atoms, wherein n is a number from one to three, inclusive, and wherein x is a number from zero to one, inclusive.

11. A hydroxy-terminated urethane composition prepared by mixing and reacting about one molar proportion of arylene diisocyanate (a) selected from the group consisting of phenylene diisocyanate, tolylene diisocyanate, and diphenylmethane-4,4'-diisocyanate, with about two molar proportions of tertiary amine nitrogen-containing polyether polyol (b), said tertiary amine nitrogen-containing polyether (b) being selected from the group consisting of polyols having the formulas:

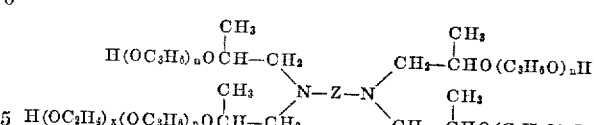

and

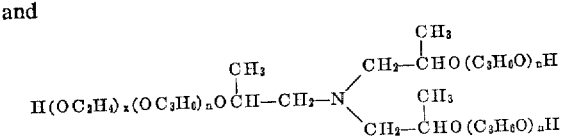

wherein Z is an alkylene radical containing from two through six carbon atoms, wherein $n$ is a number from one to three, inclusive, and wherein $x$ is a number from zero to one, inclusive.

12. A process for the production of a hydroxy-terminated urethane composition, which consists in mixing and reacting about one molar proportion of arylene diisocyanate (a) selected from the group consisting of phenylene diisocyanate, tolylene diisocyanate, and diphenylmethane-4,4'-diisocyanate, with about two molar proportions of tertiary amine nitrogen-containing polyether polyol (b), said tertiary amine nitrogen-containing polyether polyol (b) being selected from the group consisting of polyols having the formulas:

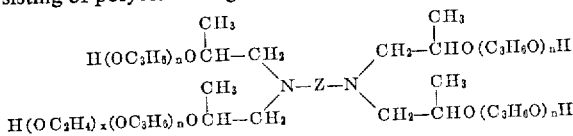

and

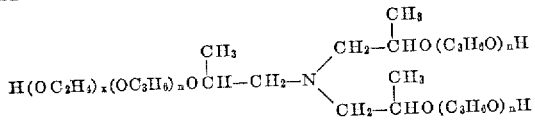

wherein Z is an alkylene radical containing from two through six carbon atoms, wherein $n$ is a number from one to three, inclusive, and wherein $x$ is a number from zero to one, inclusive.

References Cited in the file of this patent
UNITED STATES PATENTS

| | | |
|---|---|---|
| 2,814,605 | Stilmar | Nov. 26, 1957 |
| 2,858,298 | Burt | Oct. 28, 1958 |
| 2,866,774 | Price | Dec. 30, 1958 |
| 2,871,226 | McShane | Jan. 27, 1959 |
| 2,927,905 | Eckert | Mar. 8, 1960 |
| 2,948,691 | Windemuth et al. | Aug. 9, 1960 |
| 2,959,618 | Kyrides | Nov. 8, 1960 |
| 2,962,524 | Hostettler | Nov. 29, 1960 |

FOREIGN PATENTS

| | | |
|---|---|---|
| 206,295 | Australia | Feb. 10, 1955 |
| 205,456 | Australia | Jan. 4, 1957 |

OTHER REFERENCES

Abernathy: "Rubber World," March 1955, pages 765–769.

Ogden: "Rubber World," July 1957, pages 537–542.

Chemical and Engineering News, Jan. 2, 1957, page 78.

E. I. du Pont de Nemours and Co., Wilmington, Del., "Continuous Preparation of Urethane Foam Prepolymer," HR–29, July 1958.

UNITED STATES PATENT OFFICE
CERTIFICATE OF CORRECTION

Patent No. 3,105,063                                              September 24, 1963

Adolfas Damusis

It is hereby certified that error appears in the above numbered patent requiring correction and that the said Letters Patent should read as corrected below.

Column 3, line 73, for "0.2%" read -- 0.02% --; column 4, line 17, for "2-ethoxylethyl" read -- 2-ethoxyethyl --; column 5, in the table for "Example 4, first column, line 2 thereof, for "triisopropanol,amine" read -- triisopropanolamine --; same table, second column, line 4 thereof, for "141" read -- 114 --; same column 5, line 72, for "OH/1ND" read -- OH-1ND --; column 6, line 39, for "NH-1NF" read -- OH-1NF --; line 65, for "OH-1NF" read -- OH-1NG --; column 8, line 29, for "Chemcial" read -- Chemical --; line 60, for "solutions" read -- solution --.

Signed and sealed this 9th day of June 1964.

(SEAL)
Attest:

ERNEST W. SWIDER                                            EDWARD J. BRENNER

Attesting Officer                                         Commissioner of Patents